(12) United States Patent
Reinart

(10) Patent No.: US 8,504,650 B2
(45) Date of Patent: Aug. 6, 2013

(54) METHODS AND SYSTEMS FOR EXCHANGING DATA BETWEEN A COMMAND AND CONTROL INFORMATION SYSTEM AND AN ENTERPRISE RESOURCE PLANNING SYSTEM

(75) Inventor: Manfred Reinart, Germersheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/429,057

(22) Filed: Mar. 23, 2012

(65) Prior Publication Data

US 2012/0185564 A1    Jul. 19, 2012

Related U.S. Application Data

(63) Continuation of application No. 11/642,761, filed on Dec. 21, 2006, now Pat. No. 8,166,130.

(51) Int. Cl.
*G06F 15/16*    (2006.01)
*G06F 19/00*    (2011.01)

(52) U.S. Cl.
USPC ............................ 709/217; 709/246; 700/97

(58) Field of Classification Search
None
See application file for complete search history.

(56) References Cited

U.S. PATENT DOCUMENTS 6,256,676 B1 * 7/2001 Taylor et al. .................. 709/246

OTHER PUBLICATIONS

CIS Division, IMS NATO Headquarters, NATO Unclassified on ADatP-3, Part 1, NATO Message Text Formatting System (FORMETS) System Concept Description and Management (Oct. 1987), whole documents.*

Haugh et al., A comparison of the Land C2 Information Exchange Data Model and the WARSIM Object Model (Institute for Defense Analyses, 20020207), Abstract and Section 1.2.

* cited by examiner

*Primary Examiner* — Peling Shaw
(74) *Attorney, Agent, or Firm* — Finnegan, Henderson, Farabow, Garrett & Dunner, L.L.P.

(57) ABSTRACT

Systems and methods are provided for exchanging data between an enterprise resource planning system and a command and control information system. In one exemplary embodiment, a system is provided that includes a data warehouse for collecting, interpreting, consolidating, and redistributing data from the enterprise resource planning system and the command and control information system. The system also includes an enterprise application interface for providing different information exchange interfaces for exchanging the data between the enterprise resource planning system and the command and control information system in accordance with an information message format or data model of the enterprise resource planning system or the command and control information system.

20 Claims, 10 Drawing Sheets

METHODS AND SYSTEMS FOR EXCHANGING DATA BETWEEN A COMMAND AND CONTROL INFORMATION SYSTEM AND AN ENTERPRISE RESOURCE PLANNING SYSTEM

This application is a continuation of U.S. application Ser. No. 11/642,761, filed on Dec. 21, 2006 (now issued U.S. Pat. No. 8,166,130), which is expressly incorporated herein by reference in its entirety.

DETAILED DESCRIPTION

1. Technical Field

The present invention generally relates to the field of data processing and information and communication systems. More specifically, the invention relates to methods and systems for exchanging data between information systems, such as between a command and control information system and an enterprise resource planning system.

2. Background Information

Today's military forces utilize command and control information systems (C2ISs) to communicate and transfer information. Specific examples of C2ISs are the Land Forces Command Information System (SICF) used by France, and the Army Command and Control Information System (STICCE) used by Portugal or the Maritime Command and Control Information System (MCCIS). These C2ISs utilize varying information message formats and data models to communicate. Examples of information message formats include Allied Data Publication No. 3 (ADatP-3), United States Message Text Format (USMTF), Over the Horizon Targeting Gold (OTHT-Gold), and Variable Message Format (VMF). By defining a specified structure that the message must maintain, an information message format allows data to be transferred automatically within a C2IS. That is, the information message format sets forth the syntax and semantics to enable a structured message, as opposed to a free text message. Moreover, message formats may be further classified by the specific information within the message. For example, ADatP-3 messages may be classified based on messages regarding "own land force situation reports" (OWNSITREP), "logistics situation report land forces" (LOGSITLAND), "personnel reports" (PERSREP), and the like.

Data models on the other hand provide a more comprehensive approach to the handling of data within C2ISs. Data models not only define information message formats but, among other things, define how the data itself is structured, represented, and stored within a database. An example of a data model is the Command and Control Information Exchange Data Model (C2IEDM) developed by the Multilateral Interoperability Programme (MIP), Land and Control Information Exchange Data Model (LC2IEDM), and Joint Consultation Command and Control Information Exchange Data Model (JC3IEDM). The MIP is in essence a standard setting body consisting of member nations whose aim is to achieve international operability of C2ISs. For example, the MIP sets forth a minimum set of C2IS requirements that must be provided for information exchange.

Utilizing information message formats and data models, the exchange of data and information is generally only a minor problem within a national defense organization of a specific nation, because all of the entities within that defense organization may use the same information message format or data model. However, when different national defense organizations work together in a collective, such as within the North Atlantic Treaty Organization (NATO) or in a coalition, problems may arise in transferring information between the different C2ISs of these national defense organizations.

Typically, the process of transferring information among different C2ISs is via a message based exchange or data replication. Data replication may be used in homogenous environments wherein the data models and technologies are similar. On the other hand, message based exchanges may be used in heterogeneous environments wherein the data models and technologies are different. The format of the messages are governed by each specific information message format or data model. However, because the assumptions made about the methods of filling in data or interpreting received data may be different from one C2IS to another C2IS, automated data transfer is difficult. An initial work around to this problem involved utilizing specialized isolated systems to manage specific tasks, such as logistics and administrative. However, data within these specialized systems are not easily shared between each other and often the sharing of data requires the transferring of the data manually.

A partial solution to this may be achieved through the use of Enterprise Resource Planning (ERP) systems. In general, ERP systems are integrated information systems that help enterprises better control their assets and business processes by creating adaptive systems that improve internal and external operations and enhance collaboration with constituents, customers, and suppliers. One example of an ERP system is the mySAP™ ERP solution provided by SAP AG of Walldorf, Germany. An ERP system may comprise a number of individual modules or software applications that provide support for key areas of an enterprise. However, ERP systems are not limited to business organizations, but may also be integrated with C2ISs to enable, for example, the rapid transfer of mission-critical information within defense organizations.

ERP systems are an improvement over the individualized systems of the past, in that the individual modules that comprise the ERP system all have access to a common and fully integrated database and, thereby, allow stored data to be easily shared. However, current methods of integrating ERP systems with C2IS systems only allow the exchange of data based upon an information message format without an underlying reference data model being involved. For example, within these methods of integration, only information message formats, such as ADatP-3 are used. Therefore, in order for an ERP system to exchange data with a C2ISs, the two systems must use the same information message format. Furthermore, information message formats are subject to change in accordance with ongoing standardization efforts, and adapting existing systems to changing standards may only be accomplished through prohibitive efforts.

Accordingly, there is a need for a solution that provides the capability of integrating an ERP system with information systems, such as C2ISs, wherein the exchange of data between the systems may utilize varying information message formats and data models.

SUMMARY

In accordance with the principles of the present invention, as embodied and broadly described herein, methods and systems are provided for exchanging data between an enterprise resource planning system and an information system, such as a command and control information system or a simulation system.

According to one embodiment, a system is provided for exchanging data between an enterprise resource planning system and a command and control information system. The system comprises a data warehouse for collecting, interpreting, consolidating, and redistributing data from the enterprise resource planning system and the command and control information system, and an enterprise application interface for providing different information exchange interfaces for exchanging the data between the enterprise resource planning system and the command and control information system in accordance with an information message format or data model of the enterprise resource planning system or the command and control information system.

In another aspect of the invention, a method is provided for exchanging data between an enterprise resource planning system and a command and control information system. The method comprises receiving data at a data warehouse from a command and control information system or remote module comprising an enterprise application interface, importing the data into the data warehouse via different information exchange interfaces that correspond to the information message format or data model of the command and control information system or remote module from which the data was imported, and storing the data in the data warehouse in accordance with the information message format or data model of the command and control information system or remote module from which the data was imported.

According to another embodiment of the invention, a communication interface hub if provided for exchanging data between an enterprise resource planning system and a command and control information system. The communication interface hub comprises an enterprise application interface for exchanging the data between the enterprise resource planning system and the command and control information system in accordance with an information message format or data model of the enterprise resource planning system or the command and control information system.

In another aspect of the invention, a method is provided for exchanging data between an enterprise resource planning system and a command and control information system. The method comprises receiving data at a communication interface hub from the enterprise resource planning system or a command and control information system, importing the data into the communication interface hub via an information exchange interface that corresponds to the information message format or data model of the system from which the data is being imported, and converting the data into a common information message format or data model.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

BRIEF DESCRIPTION OF THE DRAWINGS

The accompanying drawings, which are incorporated in and constitute a part of this specification, show features of implementations consistent with the present invention and, together with the description, help explain principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
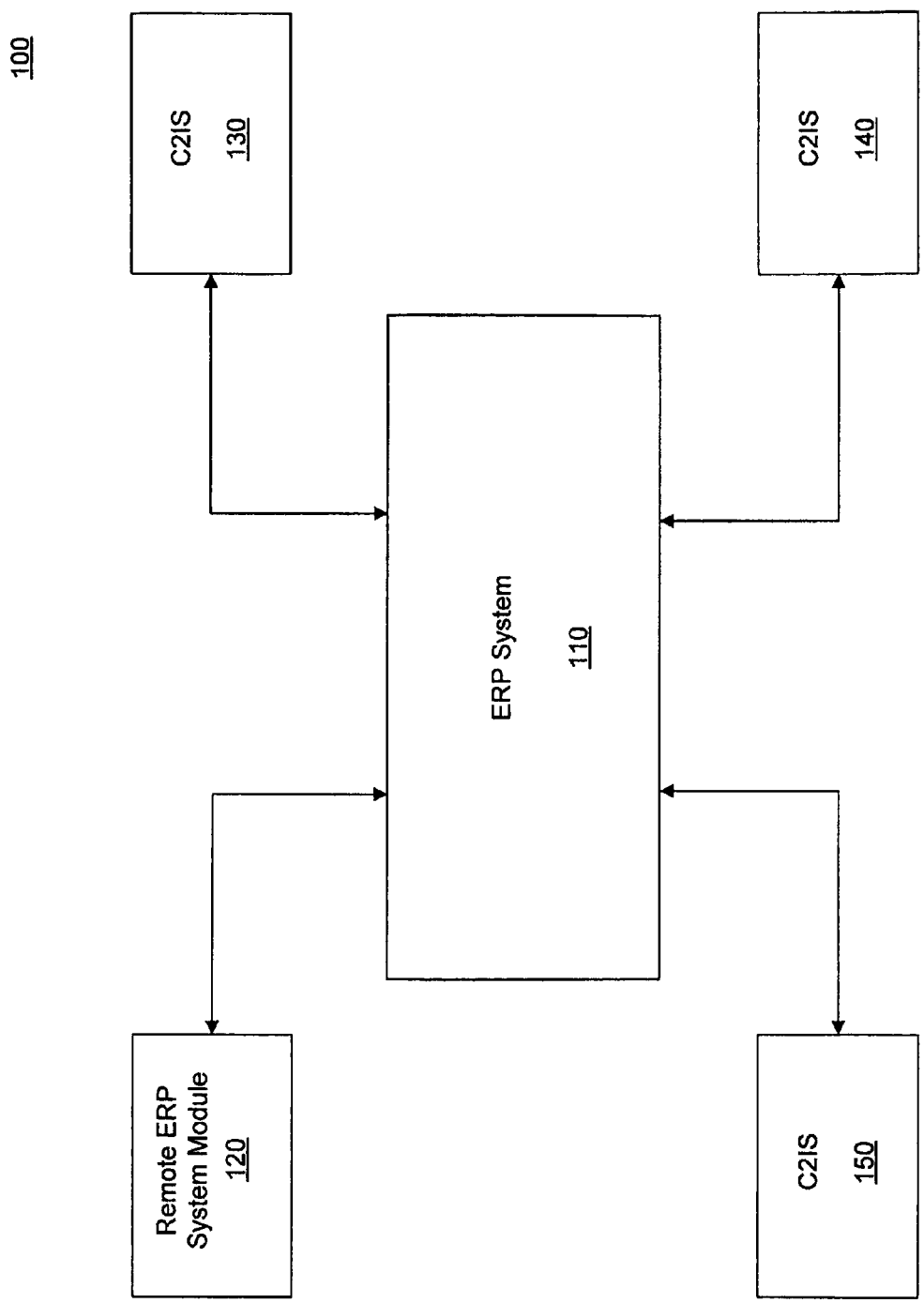
FIG. 1 illustrates a block diagram of an exemplary system, consistent with an embodiment of the present invention.

FIG. 1 illustrates a block diagram of an exemplary system 100, in accordance with an embodiment of the present invention. As shown in FIG. 1, system 100 includes an ERP system 110, a remote ERP system module 120, and C2ISs 130, 140, and 150. Examples of C2ISs 130-150 may include the Allied Deployment and Movement System (ADAMS) used by NATO, the SICF used by France, and the SICCE used by Portugal. ERP system 110 may provide tools and data to aid C2ISs in carrying out their operational tasks. For example, data stored within ERP system 110 may be used to improve planning within C2ISs 130-150 or to additionally calculate operational needs. Moreover, data within the ERP system 110 may be transferred to simulation systems for the purpose of evaluation of courses of action, training, and analysis.

Remote ERP system module 120 may be a module operating at a physical location different from that of other modules of the ERP system 110. For example, remote module 120 may be in operation in a deployed operation area, while the remaining modules of the ERP system 110 may be in operation in a homeland zone. Remote ERP system module 120 may operate in connection with ERP system 110 in an online mode via secure Internet and satellite connections or it may operate in an offline mode, where communication connections with the ERP system 110 may be broken.

Figure 2:
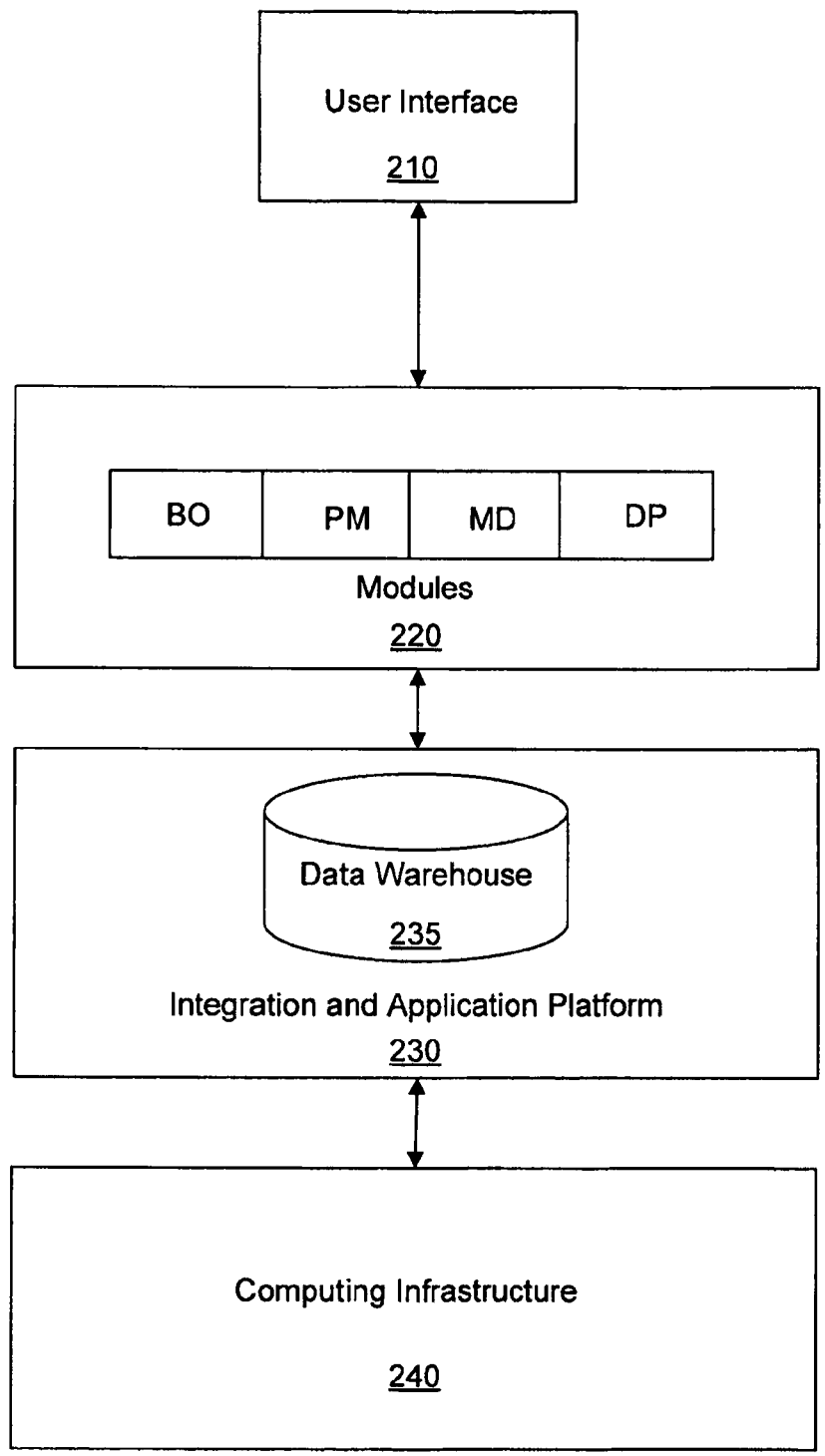
FIG. 2 illustrates a block diagram of an exemplary enterprise resource planning system, consistent with an embodiment of the present invention.

FIG. 2 illustrates a detailed embodiment of ERP system 110. As shown in FIG. 2, ERP system 110 may include a computing infrastructure 240, an integration and application platform 230, one or more modules 220, and a user interface 210.

Computing infrastructure 240 may include one or more servers and storage devices. The servers and storage devices may be collocated with each other or may be distributed across multiple locations.

Integration and application platform 230 may reside on computing infrastructure 240 and provide the foundation upon which modules 220 are developed, integrated, and run. Examples of an integration and application platform 230 include NetWeaver developed by SAP AG, .NET developed by Microsoft, and WebSphere developed by IBM.

As shown in FIG. 2, a component of integration and application platform 230 is data warehouse 235. Data warehouse 235 enables an organization, such as a defense organization, to utilize the large amount of data amassed and needed to conduct operations by providing a centralized source for collecting, interpreting, consolidating, and redistributing data that arrives from a variety of systems (e.g., C2ISs 130-150) and modules 220. An example of a commercially available data warehouse is SAP NetWeaver BI developed by SAP AG.

Modules 220 may comprise software packages that are dedicated to specific operation tasks. For example, modules 220 may include software packages dedicated to such tasks as basic organization of data (BO), personnel management (PM), materials deployment (MD), deployment planning (DP), and the like.

User interface 210 may provide an interface to allow a user to interact with the modules 220. For example, user interface 210 may be a software application, such as a browser. In some implementations, SAP Web Dynpro (commercially available from SAP AG) may be used as a model-based development environment for generating user interface 210, although other development environments may also be used.

Figure 3:
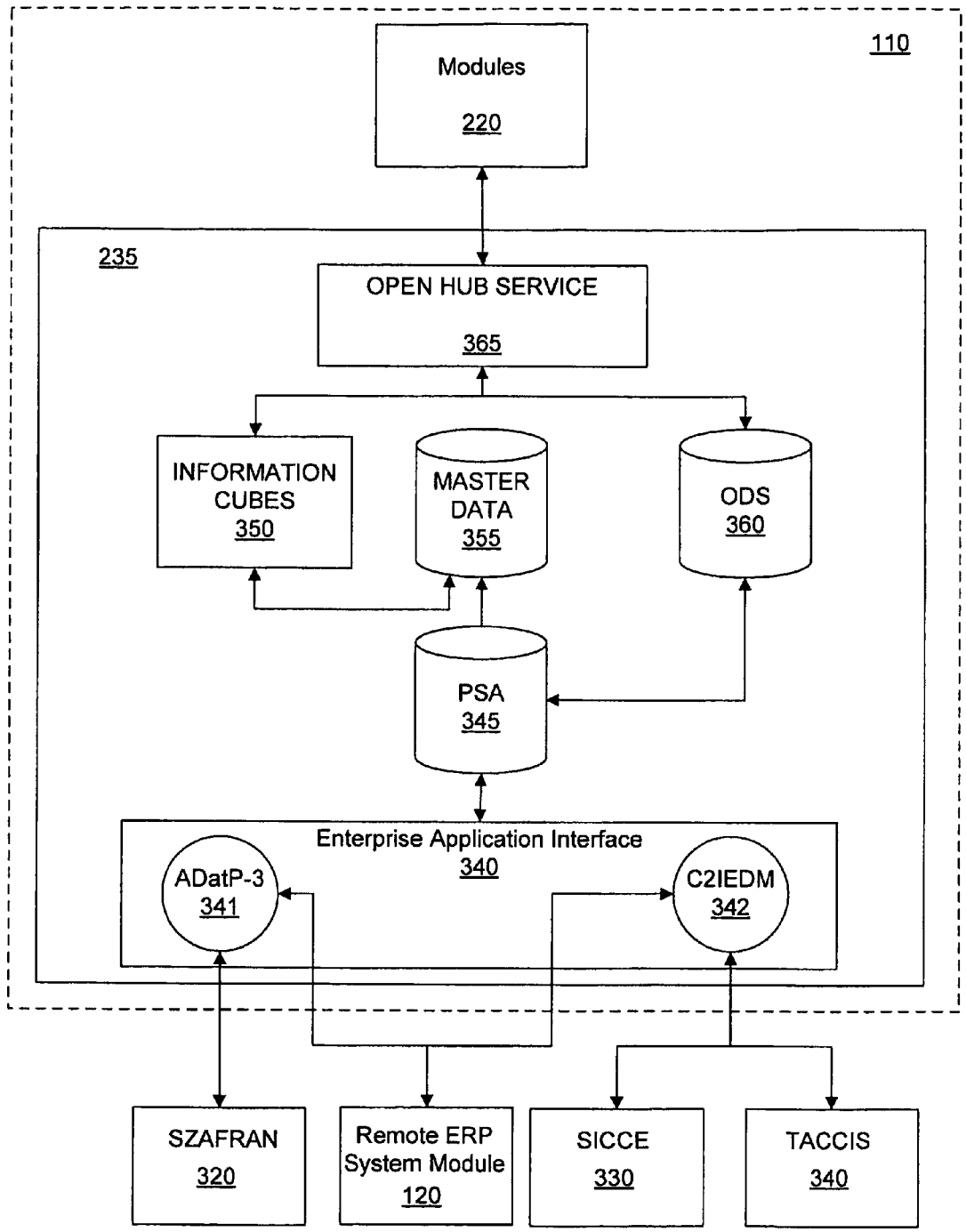
FIG. 3 illustrates a block diagram of an exemplary data warehouse, consistent with an embodiment of the present invention.

FIG. 3 illustrates a detailed embodiment of data warehouse 235, along with the flow of information between the ERP system 110 and various C2ISs 310, 320, and 330, based upon their utilized information message format or data model. As shown in FIG. 3, data warehouse 235 may comprise a persistent staging engine (PSA) 345, information cubes 350, a master data store 355, an operational data store (ODS) 360, and an open hub service 365. Data warehouse 235 may also include an enterprise application integration (EAI) component 340, which in turn may comprise one or more information exchange interfaces (interfaces 341 and 342 are shown in the example of FIG. 3).

Examples of the EAI component 340 include SAP XI (developed by SAP AG), WebSphere Enterprise Service Bus (developed by IBM), and BizTalk Server (developed by Microsoft). A function of the EAI component 340 is to implement cross-system processes. In particular, the EAI component 340 may provide different information exchange interfaces and integration scenarios for differing C2ISs.

For example, EAI component 340 may comprise an ADatP-3 information exchange interface 341 capable of importing and exporting data based on the ADatP-3 information message format. EAI component 340 may also comprise a C2IEDM data model interface 342 capable of importing and exporting data based on the C2IEDM data model. It should be noted that although certain data information exchange interfaces 341 and 342 are illustrated in FIG. 3, embodiments of the invention are not limited to only these types of information exchange interfaces and may incorporate additional or other information exchange interfaces.

Figure 4:
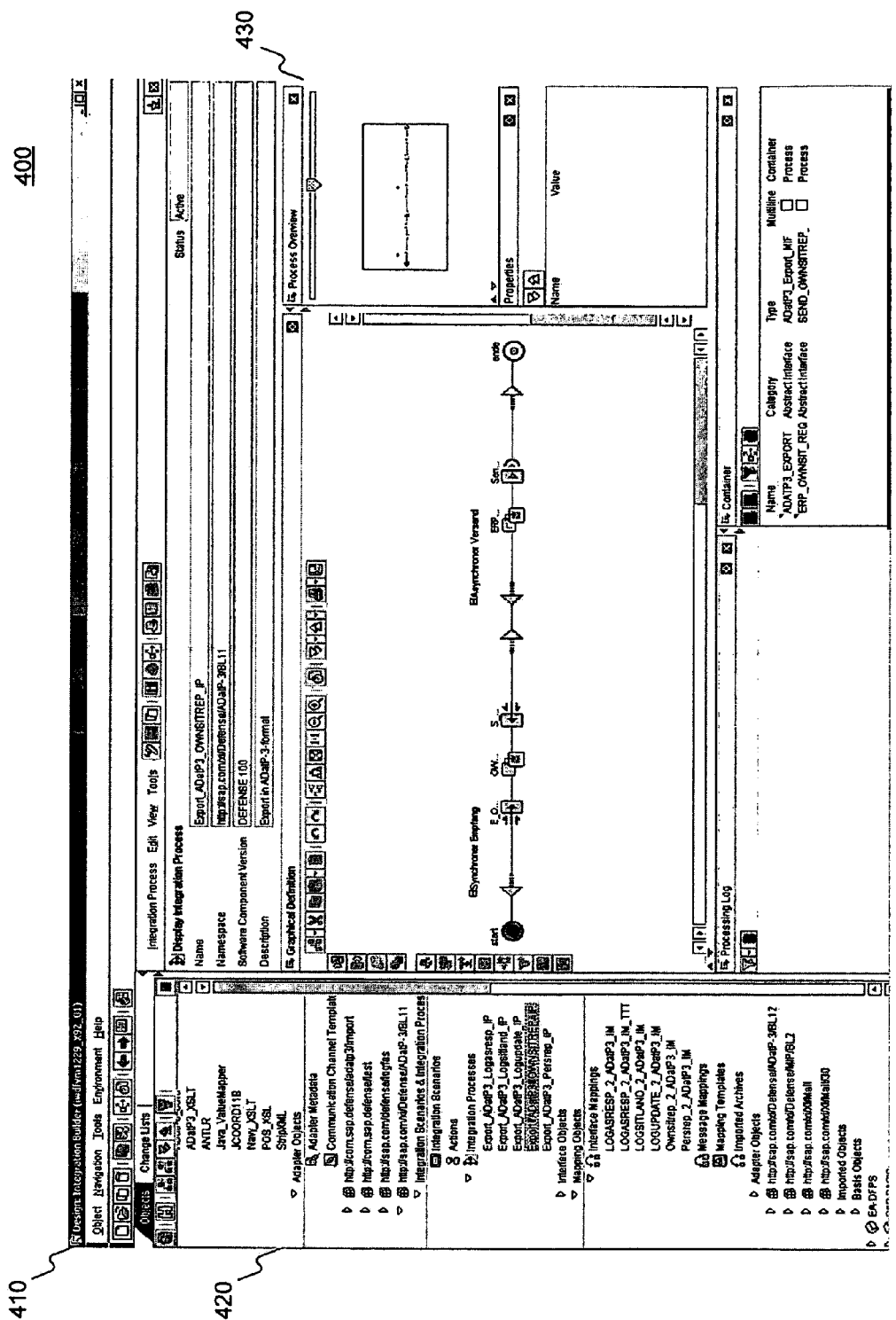
FIG. 4 illustrates a screenshot of an exemplary integration screen of a software application, consistent with an embodiment of the present invention.

FIG. 4 illustrates a screenshot of an exemplary software application, referred to herein as "EAI component integration builder" 400. The EAI component integration builder 400 is used to design the different information exchange interfaces and integration scenarios of the EAI component. The EAI component integration builder 400 may be accessed and modified via a user interface (e.g., user 210). Specifically, FIG. 4 illustrates an integration screen 410 of the EAI component integration builder 400, which may comprise a development object section 420 and an integration process section 430. In this particular example, a process of converting an ERP system message to an ADatP-3 message and exporting that message is illustrated. This process is graphically represented in the "graphical definition" portion of the integration process section 430. The process comprises receiving a synchronous message from an ERP system (e.g., ERP system 110), converting the message to a target format (e.g., ADatP-3 OWNSITREP) and sending the message asynchronously to a receiver (e.g., systems 120 and 310-330).

Figure 5:
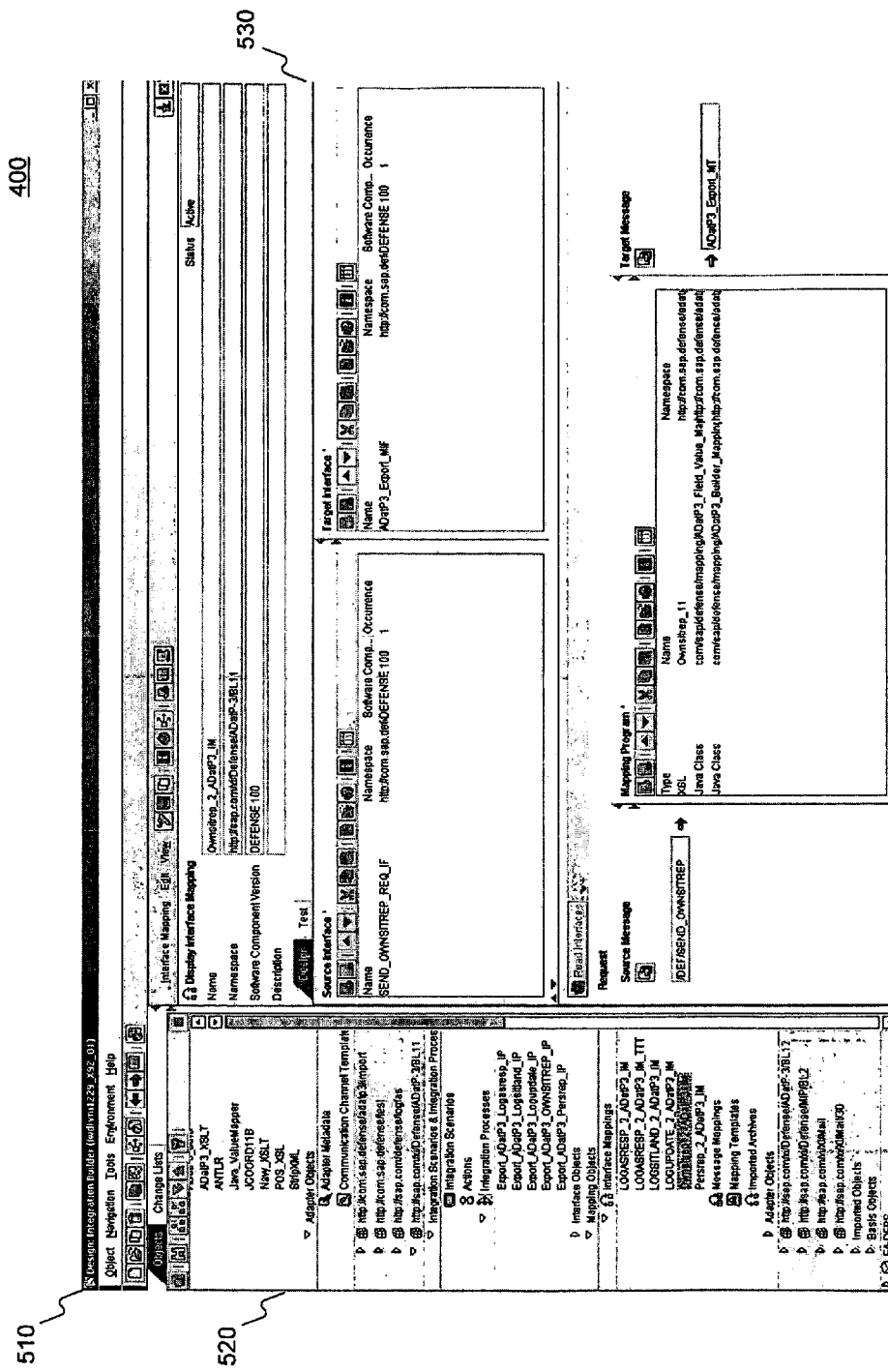
FIG. 5 illustrates a screenshot of an exemplary mapping screen of a software application, consistent with an embodiment of the present invention.

FIG. 5 illustrates a screenshot of an exemplary mapping screen 510 of the EAI component integration builder 400, which may comprise a development object section 520 (same as the development object section 420 illustrated in FIG. 4) and an interface section 530. The mapping screen 510 may allow interface mappings to be created and modified. As used herein, "interface mappings" refers to the creation of an information exchange interface (e.g., information exchange interfaces 341 and 342 illustrated in FIG. 3 and information exchange interfaces 961 and 962 illustrated in FIG. 9) by designating a particular message format to be converted from one format to another format and designating a conversion language to perform the conversion.

In the example illustrated in FIG. 5, an interface mapping "Ownsitrep_2_ADatP3_IM," is created for converting an ERP system equivalent of an OWNSITREP message to an ADatP-3 OWNSITREP message. This interface mapping may be created by selecting, within the interface section 530, the "source message" and the "target message" formats. Based upon the selected source message and the target message formats, a "mapping program" may perform the conversion by applying different conversion languages and conversion steps. As used herein, the phrase "conversion language" refers to a computer language designed to convert an input text of one format to a modified text of another format. In this particular conversion process, first the conversion language eXtensible Stylesheet Language (XSL) is used. The conversion is completed by utilizing tools created in two Java classes. The Java classes may be created by application developers to perform the specific conversion tasks required for varying information mappings. The illustrated conversion languages and steps are exemplary only, and other conversion languages and steps may be used.

Figure 6:
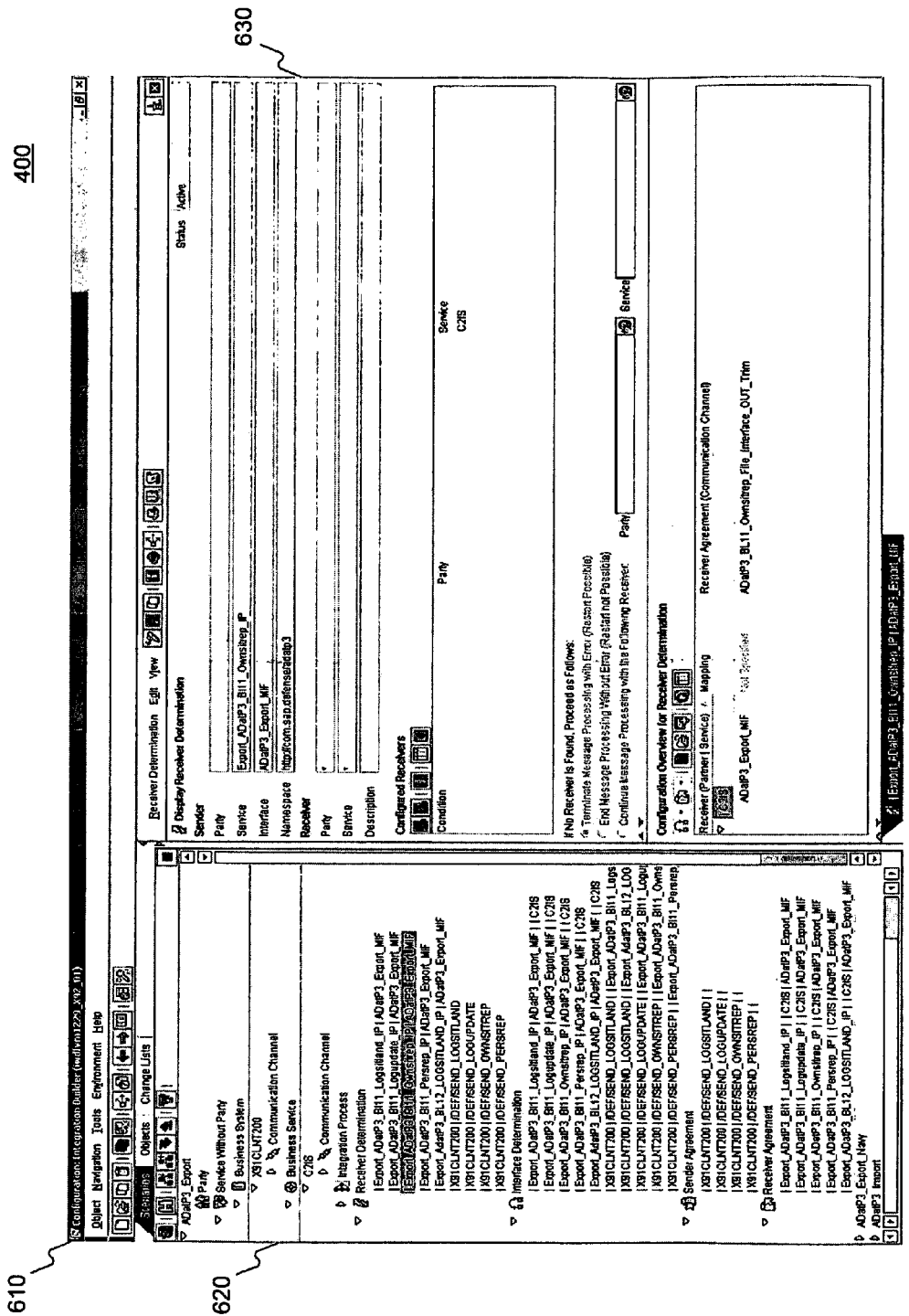
FIG. 6 illustrates a screenshot of an exemplary scenario screen of a software application, consistent with an embodiment of the present invention.

FIG. 6 illustrates a screenshot of an exemplary scenario screen 610 of the EAI component integration builder 400, which may comprise a scenario section 620 and a determination section 630. The scenario screen 610 may allow the interface mapping process to be configured based on, for example, a specified receiver and/or sender of a message, the communication interface between a receiver and a sender, and agreements entered into by a receiver and a sender. In the example illustrated in FIG. 6, an interface mapping process configuration is created for a specific scenario wherein a message is being exported to a C2IS. As illustrated, the configuration may be created by designating within the determination section 630 that when the receiver of the message is determined to be a C2IS, the message should be exported in ADatP-3 message format.

Other scenarios not illustrated, may include determining the communication interface between a receiver and a sender, and designated a message format for exporting data based on the determination. For example, if the communication interface between the receiver and sender were determined to be based on a remote function call (RFC), the message format may be exported in the ADatP-3 format. Additionally, a scenario may be configured to export data within a specific format based on an agreement or designation of the sender or receiver. For example, an agreement between an ERP system and C2IS system may set forth that messages must be communicated in the ADatP-3 format. The above scenario configurations are exemplary only, and other scenario configurations may be used.

Moreover, although the interface mappings illustrated in FIGS. 4-6 were limited to conversions involving the ADatP-3 message formats, this limitation was done solely for the ease of discussion. EAI component integration builder 400 is capable of designing and configuring different interface mappings involving different message formats and data models. The different message formats and data models may include, but are not limited to, ADatP-3, USMTF, OTHT-Gold, VMF, NATO Functional Area Services (FAS), C2IEDM, LC2IEDM, and JC3IEDM.

Returning to FIG. 3, communication between the C2ISs 310-330 and the ERP system 110 is managed by the EAI component 340, in particular, the information exchange interfaces 341 and 342. For example, the SZAFRAN C2IS 310 is based on the ADatP-3 information message format. Therefore, the exchange of data between the ERP system 110 and the SZAFRAN C2IS 310 may be managed by the ADatP-3 information exchange interface 341. On the other hand, the SICCE 320 and the Tactical Area Command and Control Information System (TACCIS) 330 are both based on the C2IEDM data model. Therefore, the exchange of data between the ERP system 110 and the SCIE 320 or TACCIS 330 may be managed by the C2IEDM data model information exchange interface 342.

The EAI component 340 allows data of varying information message formats and data models to be imported into data warehouse 235 and stored in accordance with the information message format or data model of the system from which the data is being imported or the data may be converted and stored in a message format or data model of the ERP system 110. As a result, data warehouse 235 may store data in multiple information formats and data models simultaneously. For example, data warehouse 235 may store data based on the ADatP-3 information message format and data based on the C2IEDM data model at the same time.

Data imported by the information exchange interfaces 341 and 342 can be first stored in PSA 345. PSA 345 may minimize the impact on busy operational systems during migration of data to the data warehouse 235, and provide short-term storage of the data. From PSA 345, the data is subsequently transformed and loaded into one or more relational databases, such as ODS 360 and master data store 355. For example, ODS 360 is a relational database for current detailed transactional data. The data within ODS 360 is stored within ODS objects, which contain key fields and data fields that can also contain character fields as key figures. Master data store 355 is a database that may store data that describes characteristics of information in a defense organization, such as OWNSITREP, LOGSITLAND, PERSREP, and the like. The relational databases may be further used to build multidimensional models, which are referred to herein as information cubes 350. Information cubes 350 may construct an extended star schema whose dimensions contain links to master data and other detail records in data warehouse 235. Further, open hub service 365 may provide tools for defining, scheduling, and managing the extraction of data from data warehouse 235 to modules 220. On the contrary, the importing and exporting of data to remote modules, such as remote ERP system module 120 may be managed by EAI component 340.

The exchange of data between the ERP system 110 to the C2ISs 310-330 may be configured by the EAI component integration builder 400 to exchange data in accordance with the utilized information message format or data model of the C2IS receiving or sending the data. For example, data exchanged with the SZAFRAN 310 is based on the ADatP-3 information message format. Data exchanged with the SICCE 320 and TACCIS 330 is based on the C2IEDM data model. Data exchanged with the remote ERP system module 120, may be based on both the ADatP-3 information message format or the C2IEDM data model. Therefore, the exchange of data between the ERP system 110 and the remote ERP system module 120 may be managed by either the ADatP-3 information exchange interface 341 or the C2IEDM data model information exchange interface 342. As discussed above, in addition to the information exchange format or data model, the data may be further organized and stored in the master data store 355. For example, information regarding an operation's organizational structure may be exported to the SZAFRAN 320 as an ADatP-3 OWNSITREP message, whereas information regarding related personnel, materials, and resources is transferred in a PERSREP and LOGSITLAND formats. Using the C2IEDM data model, data is exchanged with the C2ISs 320 and 330 and the remote ERP system module 120 via an MIP replication server (not illustrated). The MIP replication server is defined by the MIP body and handles the physical transfer of MIP data. Each communication system utilizing the C2IEDM data model, such as the C2ISs 320 and 330, and the remote ERP system module 120 uses a replication server on its side.

Figure 7:
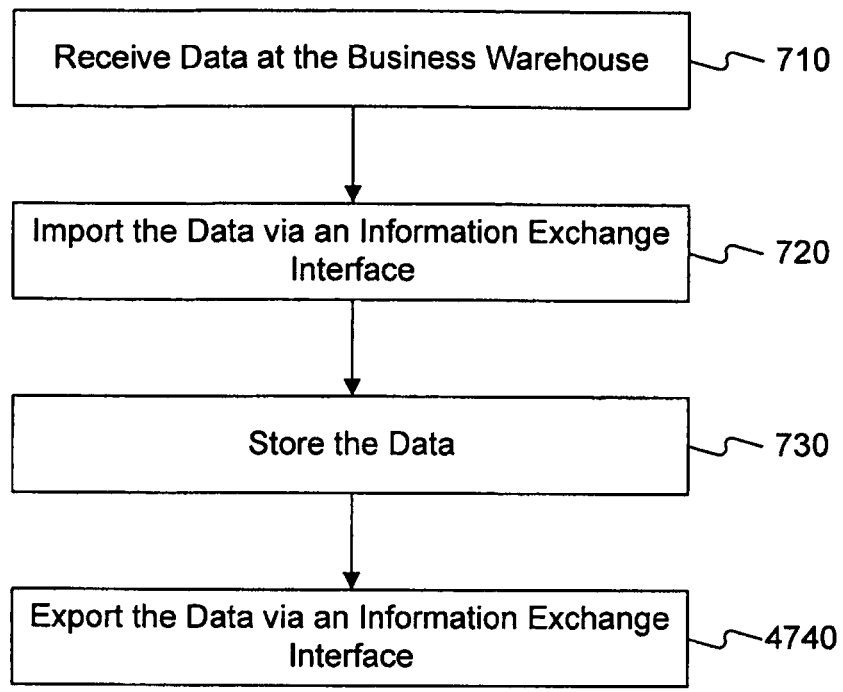
FIG. 7 illustrates a flowchart of an exemplary method of importing data, consistent with an embodiment of the present invention.

FIG. 7 illustrates a flowchart of an exemplary method of importing data, in accordance with an embodiment of the invention. In an initial step, data is received at the data warehouse 235 (step 710). The data may be sent by C2ISs 320-330 or a remote module of the ERP system 120. The received data is imported into the data warehouse 235 via an information exchange interface 341 or 342 (step 720).

The use of a specific information exchange interface 341 or 342 to import the data is in accordance with the different information exchange interfaces and integration scenarios designed and configured by the EAI component integration builder 400. For example, the EAI component integration builder 400 may design information exchange interfaces for exchanging data based on the ADatP-3 message format and the C2IEDM data model. Moreover, the EAI component integration builder 400 may configure an integration scenario wherein the data format used to exchange data between the ERP system 110 and systems 120 and 310-330 is based on a predetermined designation or agreement. For example, in situations wherein the importing system utilizes more than one information exchange format or data model, the predetermined designation or agreement may set forth the particular information exchange format or data model to be used to exchange the data. Once the data is imported by the EAI component 340, it may be stored in the data warehouse 235 in accordance with the information message format or data model of the C2IS or remote module from which the data was imported or the information message format or data model used by the ERP system 110 (step 730). If the data is stored in the message format or data model of the ERP system 110, an additional step of converting the data to the message format or data model of the ERP system 110 may be provided before the data is stored.

Figure 8:
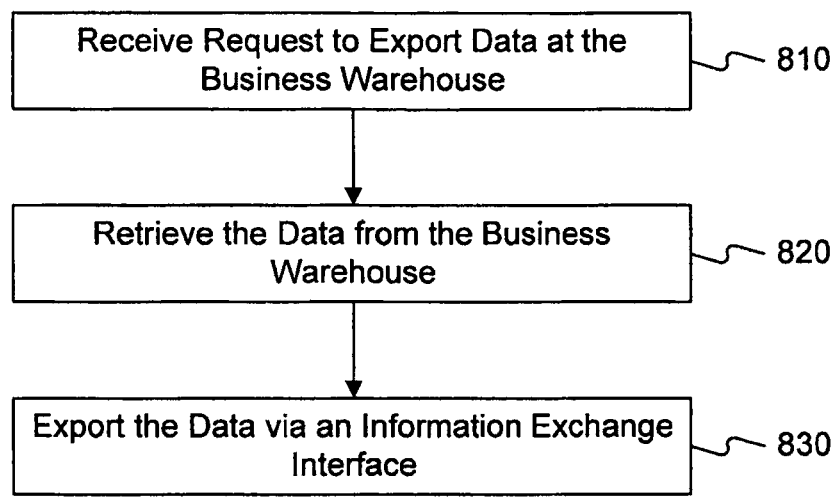
FIG. 8 illustrates a flowchart of an exemplary method of exporting data, consistent with an embodiment of the present invention.

FIG. 8 illustrates a flowchart of an exemplary method of exporting data, in accordance with an embodiment of the invention. In an initial step, a request is received to export data from the data warehouse 235 (step 810). A request to export the data may be sent by any one of C2ISs 310-330 or a remote module of the ERP system 120 to the EAI component 340. Subsequent to receiving a request, EAI component 340 retrieves the data (step 820). The data is then exported to the requesting system (step 830). The exporting of data is in accordance with the different information exchange interfaces and integration scenarios designed and configured by the EAI component integration builder 400. If the requested data was stored in a message format or data model different than that of the message format or data model of the requesting system, an additional step of converting the data may be included before the data is exported. As used herein, "exporting" or "importing" the data does not necessarily mean that the data is deleted from its source storage location. Instead, in certain aspects of the invention, only a copy of the data may be exported or exported.

Figure 9:
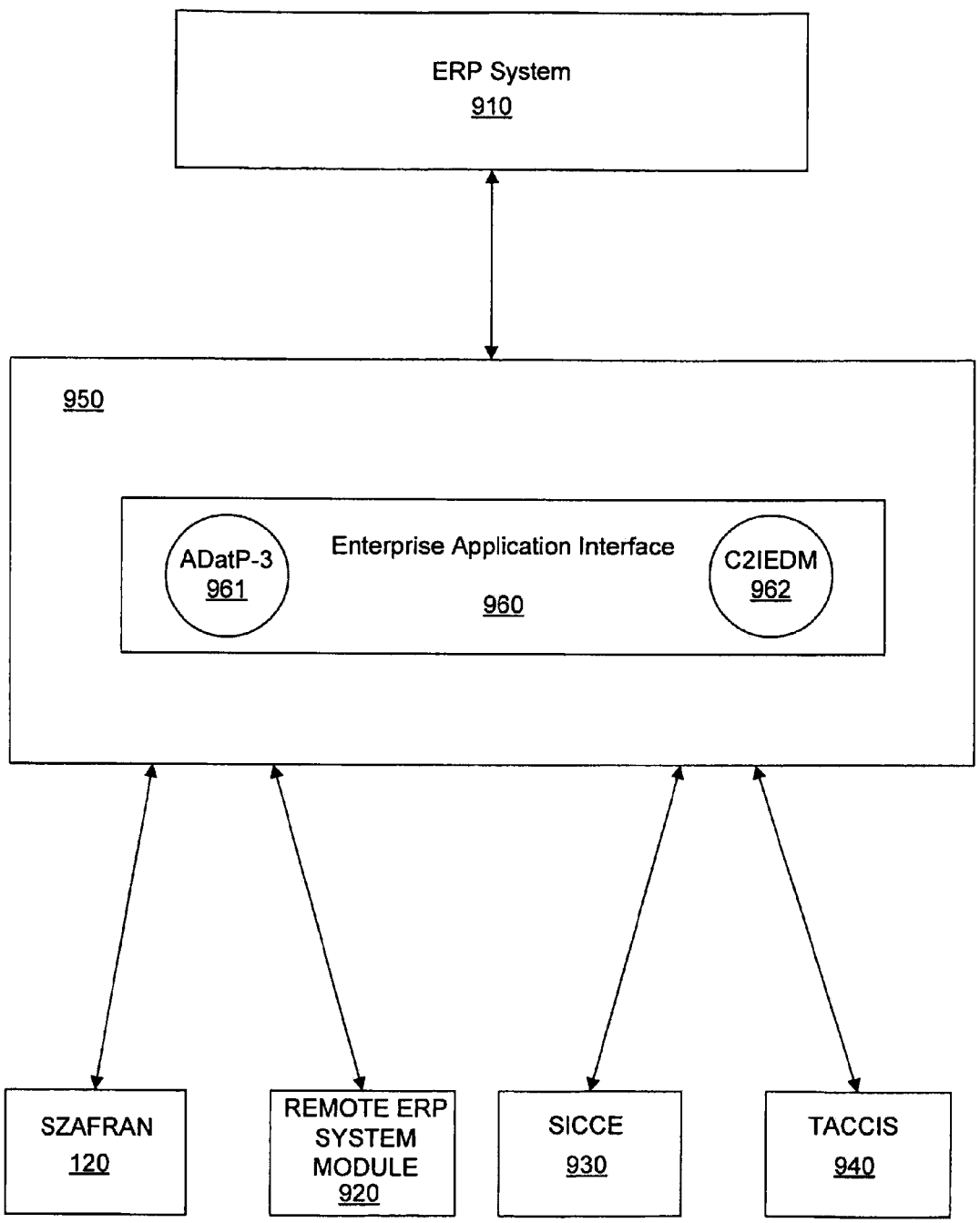
FIG. 9 illustrates a block diagram of another exemplary communication system, consistent with an embodiment of the present invention.

FIG. 9 illustrates a block diagram of an exemplary system 900, in accordance with another embodiment of the present invention. As shown in FIG. 9, system 900 includes an ERP system 910, one or more C2ISs 920, 930, and 940, remote ERP system module 120, and a communication interface hub 950. In contrast to the embodiment of FIG. 3, in this embodiment there is no point to point information exchange interface between the C2ISs 920-940, remote ERP system module 120, and the ERP system 910. Instead, C2ISs 920-940 and remote ERP system module 120 attach to communication interface hub 950 and the communication interface hub 950 attaches to the ERP system 910.

As illustrated in FIG. 9, communication interface hub 950 comprises an EAI component 960, which may be implemented in a similar fashion to that of EAI component 340. Data exchange between the C2ISs 920-940, remote ERP system module 120, and the ERP system 910 is accomplished via the communication interface hub 950. The EAI component 960 may include one or more interfaces, such as an ADatP-3 information exchange interface 961 capable of exchanging data messages based on the ADatP-3 information message format and a C2IEDM data model information exchange interface 962 capable of exchanging data messages based on the C2IEDM data model. It should be noted that although certain data information exchange interfaces 961 and 962 are illustrated in FIG. 9, embodiments of the invention are not limited to only these types of information exchange interfaces and may incorporate additional or other information exchange interfaces.

Data exchanged among the C2ISs 920-940, remote ERP system module 120, or ERP system 910 are exchanged in accordance with the information message format or data model of each particular system involved in the data exchange. Communication interface hub 950 acts as an intermediary in the data exchange process of the varying systems. For example, once the data is received at the communication interface hub 950, the data is converted by the EAI component 960 into a common information message format or data model before the data exchange process is completed. For example, a common data model may be the C2IEDM data model. After converting the data to the common information message format or data model, the data is again converted to the specific information message format or data model of the system receiving the data. Therefore, instead of wiring senders directly to receivers with a specialized interface mapping chain from the sender-specific format to a format recognized by a receiver, potential receivers attach to the communication interface hub 950 by a configuration of a interface mapping chain that only has to cope with the conversion from the common information message format or data model to a specific receiver format.

As a result, in comparison to the previous embodiment, the number of interface mappings created by the EAI component integration builder 400 may be reduced. For example, in the first embodiment, in order to manage information exchange between four different systems utilizing four different message formats, such as ADatP-3, USMTF, OTHT-Gold, and VMF, the following twelve interface mappings are needed:
ADatP-3→USMTF;
USMTF→ADatP-3;
ADatP-3→OTHT-Gold;
OTHT-Gold→ADatP-3
ADatP-3→VMF;
VMF→ADatP-3;
USMTF→OTHT-Gold;
OTHT-Gold→USMTF;
USMTF→VMF;
VMF→USMTF;
OTHT-Gold→VMF; and
VMF→OTHT-Gold.

However, in the present embodiment, which utilizes a common data model, such as C2IEDM, in order to manage information exchange between four different systems utilizing four different message formats, such as ADatP-3, USMTF, OTHT-Gold, and VMF, only the following eight interface mappings are needed:
ADatP-3→C2IEDM;
C2IEDM→ADatP-3;
USMTF→C2IEDM;
C2IEDM→USMTF;
OTHT-Gold→C2IEDM;
C2IEDM→OTHT-Gold;
VMF→C2IEDM; and
C2IEDM→VMF.

Figure 10:
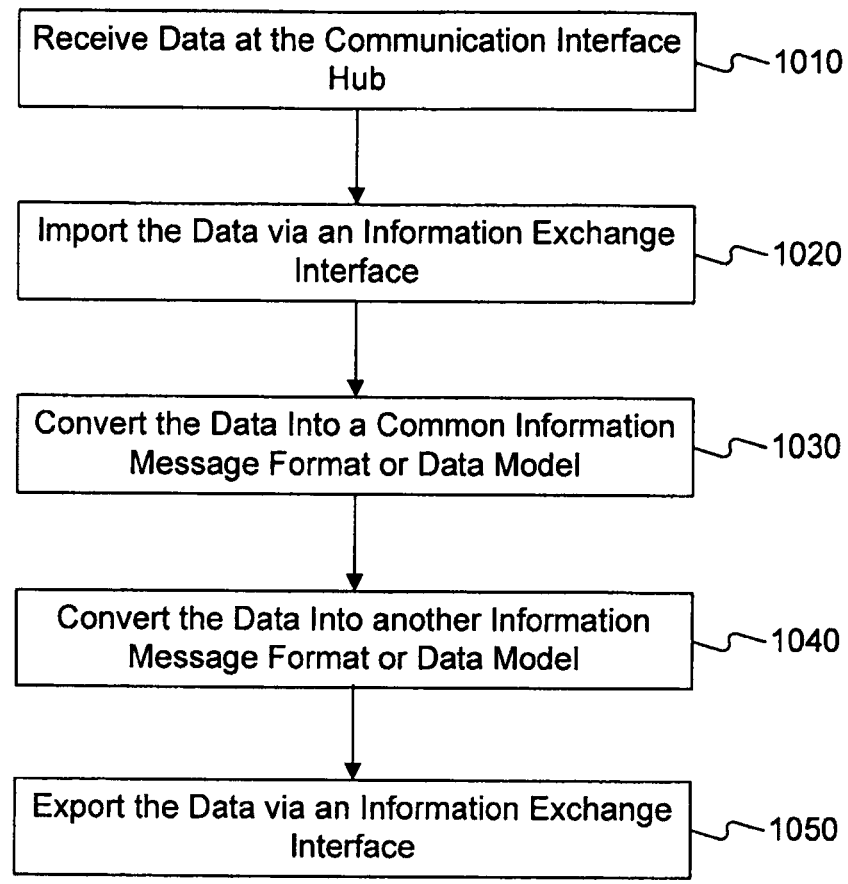
FIG. 10 illustrates a flowchart of another exemplary method of exchanging data, consistent with an embodiment of the present invention.

FIG. 10 illustrates a flowchart of an exemplary method of exchanging data between different systems utilizing the communication interface hub 950. In an initial step, data is received at the communication interface hub 950 (step 1010). The data may be sent by C2ISs 920-940, remote ERP system module 920, or ERP system 910. The received data is imported into the communication interface hub 960 via an information exchange interface 971 or 972 (step 1020). The exchanging of data between different systems utilizing the communication interface hub 970 is managed in accordance with the different information exchange interfaces and integration scenarios designed and configured by the EAI component integration builder 400. For example, the EAI component integration builder 400 may design information exchange interfaces for exchanging data based on a scenario, such as, a specified receiver and/or sender of a message, the communication interface between a receiver and a sender, and agreements entered into by a receiver and a sender.

Once the data is imported, it is converted into a common information message format or data model, such as the C2IEDM data model (step 1030). In a subsequent step, the data is converted from the common information message format or data model to an information message format or data model of the system to which the data is being sent (step 1040). Again, the exchanging of data between different systems utilizing the communication interface hub 970 is managed in accordance with the different information exchange interfaces and integration scenarios designed and configured by the EAI component integration builder 400. Subsequently, the data is exported from the communication interface hub 960 via an information exchange interface 971 or 972 (step 1050). It should be noted that if the information message format or data model of the data imported is the same as that of the common information message format or data model, then the conversion step 1030 may be omitted. Likewise, if the common information message format or data model is the same as the information message format or data model to be used to export the data, then the conversion step 1040 may be omitted.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. For example, the communication interface hub 950 may include short term or long term storage means to store data, such as a business warehouse. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for exchanging data between an enterprise resource planning system and command and control information systems, comprising:
    one or more computers configured to:
        provide information exchange interfaces for exchanging data between the enterprise resource planning system and at least a first command and control information system and a second command and control information system, wherein:
            the enterprise resource planning system uses a first data protocol, and
            the first command and control information system uses a second data protocol;
        receive first data from the first command and control information system consistent with the second data protocol;
        store the first data in a data warehouse, wherein the data warehouse simultaneously stores second data received from at least a third command and control information system consistent with a data protocol other than the stored first data; and
        send the first data to the second command and control information system;
            wherein the exchange of the first and second data is based on an ADatP-3 information message format.

2. The system of claim 1, wherein the first data protocol is a common data protocol.

3. The system of claim 1, wherein the second data is stored consistent with a data protocol used by the third command and control information system.

4. The system of claim 1, wherein the first data is sent in accordance with a data protocol of the second command and control information system.

5. The system of claim 1, wherein the first data protocol is the same data protocol as the second data protocol.

6. The system of claim 1, wherein the first data is converted to be consistent with the first data protocol and is stored consistent with the first data protocol in the data warehouse.

7. The system of claim 1, wherein the first data is stored consistent with the first data protocol and is converted to be consistent with a third data protocol used by the second command and control information system before the first data is sent to the second command and control information system.

8. The system of claim 1, wherein the first data is converted prior to being sent to the second command and control information system, and wherein the conversion is based on a specified receiver and/or sender of the first data.

9. The system of claim 1, wherein the first data is converted prior to being sent to the second command and control information system, and wherein the conversion is based on a communication interface between a receiver and a sender of the first data.

10. The system of claim 1, wherein the first data is converted prior to being sent to the second command and control information system, and wherein the conversion is based on agreements entered into by a receiver and a sender of the first data.

11. A computer-implemented method of exchanging data between an enterprise resource planning system and command and control information systems, the computer-implemented method comprising:
    receiving, at an enterprise resource planning system using a first data protocol, first data from a first command and control information system in a second data protocol used by the first command and control information system;
    storing the first data in a data warehouse, wherein the data warehouse simultaneously stores second data received from at least a third command and control information system consistent with a data protocol other than the stored first data; and
    sending the first data to the second command and control information system;
        wherein the exchange of the first and second data is based on an ADatP-3 information messsage format.

12. The method of claim 11, wherein the first data protocol is a common data protocol.

13. The method of claim 11, wherein the second data is stored consistent with a data protocol used by the third command and control information system.

14. The method of claim 11, wherein the first data is sent in accordance with a data protocol of the second command and control information system.

15. The method of claim 11, wherein the first data protocol is the same data protocol as the second data protocol.

16. The method of claim 11, wherein the first data is converted to be consistent with the first data protocol and is stored consistent with the first data protocol in the data warehouse.

17. The method of claim 11, wherein the first data is stored consistent with the first data protocol and is converted to be consistent with a third data protocol used by the second command and control information system before the first data is sent to the second command and control information system.

18. The method of claim 11, wherein the first data is converted prior to being sent to the second command and control information system, and wherein the conversion is based on a specified receiver and/or sender of the first data.

19. The method of claim 11, wherein the first data is converted prior to being sent to the second command and control information system, and wherein the conversion is based on a communication interface between a receiver and a sender of the first data.

20. The method of claim 11, wherein the first data is converted prior to being sent to the second command and control information system, and wherein the conversion is based on agreements entered into by a receiver and a sender of the first data.

* * * * *